(12) United States Patent
Chen et al.

(10) Patent No.: US 12,244,424 B2
(45) Date of Patent: Mar. 4, 2025

(54) HARQ-ACK PROCESSING METHOD AND DEVICE

(71) Applicant: VIVO MOBILE COMMUNICATION CO.,LTD., Guangdong (CN)

(72) Inventors: Xiaohang Chen, Guangdong (CN); Zhi Lu, Guangdong (CN); Xiaodong Shen, Guangdong (CN); Na Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 435 days.

(21) Appl. No.: 17/568,563

(22) Filed: Jan. 4, 2022

(65) Prior Publication Data

US 2022/0131650 A1    Apr. 28, 2022

Related U.S. Application Data

(63) Continuation of application No. PCT/CN2020/098006, filed on Jun. 24, 2020.

(30) Foreign Application Priority Data

Jul. 5, 2019  (CN) .......................... 201910604777.1

(51) Int. Cl.
*H04L 1/1812* (2023.01)
*H04L 5/00* (2006.01)
(Continued)

(52) U.S. Cl.
CPC .......... *H04L 1/1812* (2013.01); *H04L 5/0053* (2013.01); *H04W 28/06* (2013.01);
(Continued)

(58) Field of Classification Search
CPC ... H04L 1/1812; H04L 5/0053; H04L 5/0064; H04L 1/1854; H04L 1/1861;
(Continued)

(56) References Cited

U.S. PATENT DOCUMENTS

2011/0228731 A1  9/2011  Luo et al.
2014/0036856 A1  2/2014  Park
(Continued)

FOREIGN PATENT DOCUMENTS

CN  109075914 A  12/2018
CN  109639398 A  4/2019
(Continued)

OTHER PUBLICATIONS

U.S. Appl. No. 62/843,142, filed May 3, 2019 (Year: 2019).*
(Continued)

*Primary Examiner* — Sun Jong Kim
(74) *Attorney, Agent, or Firm* — IP & T GROUP LLP

(57) ABSTRACT

A hybrid automatic repeat request acknowledgement (HARQ-ACK) processing method includes: selecting at least a part of HARQ-ACK bits as a first HARQ-ACK bit from a first HARQ-ACK codebook according to at least one of information indicated by DCI corresponding to the first HARQ-ACK codebook or indexes of carriers where PDSCHs corresponding to the first HARQ-ACK codebook are located, and according to at least one of a quantity of multiplexed HARQ-ACK bits or a code rate of HARQ-ACK transmission; and discarding the first HARQ-ACK bit; or determining a first HARQ-ACK bit from a first HARQ-ACK codebook according to at least one of the information indicated by the DCI or the indexes of carriers; and multiplexing the first HARQ-ACK bit and HARQ-ACK bits in a second HARQ-ACK codebook. The first HARQ-ACK bit is at least a part of HARQ-ACK bits in the first HARQ-ACK codebook.

7 Claims, 9 Drawing Sheets

(51) Int. Cl.
  *H04W 28/06* (2009.01)
  *H04W 72/0446* (2023.01)
  *H04W 72/0453* (2023.01)
  *H04W 72/23* (2023.01)
  *H04W 72/56* (2023.01)
(52) U.S. Cl.
  CPC ... *H04W 72/0446* (2013.01); *H04W 72/0453* (2013.01); *H04W 72/23* (2023.01); *H04W 72/56* (2023.01)
(58) Field of Classification Search
  CPC .... H04L 5/0055; H04L 1/1896; H04W 28/06; H04W 72/0446; H04W 72/0453; H04W 72/23; H04W 72/56
  See application file for complete search history.

(56) References Cited

U.S. PATENT DOCUMENTS

| | | | |
|---|---|---|---|
| 2017/0273056 A1 | 9/2017 | Papasakellariou | |
| 2020/0007296 A1* | 1/2020 | Papasakellariou | H04L 5/0053 |
| 2020/0213044 A1 | 7/2020 | Peng et al. | |
| 2020/0228248 A1* | 7/2020 | Islam | H04L 1/1861 |
| 2020/0295878 A1* | 9/2020 | Choi | H04W 72/1273 |
| 2020/0295886 A1* | 9/2020 | Gou | H04L 1/1896 |
| 2021/0075558 A1* | 3/2021 | Takeda | H04W 72/23 |
| 2021/0360638 A1 | 11/2021 | Lin | |
| 2022/0078768 A1* | 3/2022 | El Hamss | H04L 5/0055 |
| 2022/0183025 A1* | 6/2022 | Fröberg | H04L 5/0007 |

FOREIGN PATENT DOCUMENTS

| | | | |
|---|---|---|---|
| CN | 109691006 A | 4/2019 | |
| CN | 109792326 A | 5/2019 | |
| CN | 109842477 A | 6/2019 | |
| EP | 3905566 A1 | 11/2021 | |
| WO | 2012/144865 A3 | 10/2012 | |
| WO | 2018/175820 A1 | 9/2018 | |
| WO | 2019/099569 A1 | 5/2019 | |

OTHER PUBLICATIONS

U.S. Appl. No. 62/828,309, filed Apr. 2, 2019 (Year: 2019).*
Physical layer enhancements for DL SPS, 3GPP TSG RAN WG1 #97, R1-1906219, May 13-17, 2019, Reno, USA. Source: NTT DOCOMO, INC.
On enhancements to UCI for eURLLC, 3GPP TSG RAN WG1 #96bis, R1-1904306, Apr. 8-12, 2019, Xi'an China. Source: Intel Corporation.
International Search Report and Written Opinion of International Application No. PCT/CN2020/098006 issued by the Chinese Patent Office on Sep. 22, 2020.
First Office Action of Priority Application No. CN 201910604777.1 issued by the Chinese Patent Office on Mar. 18, 2021.
The Second Office Action of Priority Application No. CN 201910604777.1 issued by the Chinese Patent Office on Sep. 8, 2021.
NTT DOCOMO, INC., HARQ ACK multiplexing when CBG-based (re)transmission is not configured, 3GPP TSG RAN WG1 NR Ad-Hoc#2, Jun. 27-30, 2017, p. 1-3, R1-1711116, Qingdao, P.R. China.
CATT, UL control enhancements for URLLC, 3GPP TSG RAN WG1 Meeting #97, May 13-17, 2019, R1-1906328, Reno, USA.
Vivo, Discussion on eMBB and URLLC UCI multiplexing, 3GPP TSG RAN WG1 Meeting #93, May 21-25, 2018, p. 1-4, R1-1806064, Busan, Korea.
Extended European Search Report for European Patent Application No. 20837026.2 issued by the European Patent Office on Jul. 25, 2022.

* cited by examiner

HARQ-ACK PROCESSING METHOD AND DEVICE

CROSS-REFERENCE OF RELATED APPLICATIONS

This application is a Bypass Continuation Application of PCT/CN2020/098006 filed on Jun. 24, 2020 which claims priority to Chinese Patent Application No. 201910604777.1 filed on Jul. 5, 2019, which are incorporated herein by reference in their entirety.

TECHNICAL FIELD

Embodiments of the present disclosure relate to the field of communication technologies, and in particular, to a hybrid automatic repeat request acknowledgment (HARQ-ACK) processing method and a device.

BACKGROUND ART

Compared with the previous mobile communication systems, mobile communication systems of future fifth-generation (5G) mobile communication technologies need to adapt to more diverse scenarios and service requirements. The main scenario of new radio (NR) includes enhanced mobile broadband (eMBB), massive machine type communication (mMTC), and ultra-reliable and low latency communication (URLLC). These scenarios require high reliability, low latency, large bandwidth, and wide coverage of systems.

These different services have different quality of service (QoS) requirements. For example: URLLC supports a low latency and high reliable service. To reach higher reliability, data needs to be transmitted at a lower code rate, and at the same time, channel state information (CSI) needs to be fed back faster and more accurately. The eMBB service has the requirement of a high throughput, but is less sensitive to latency and reliability than URLLC. In addition, for some terminals (for example, user equipment (UE)) may support services of different numerology configurations, the terminals not only support the low latency and highly reliable URLLC service, but also support the large-capacity and high-rate eMBB service.

SUMMARY

According to a first aspect, an embodiment of the present disclosure provides a HARQ-ACK processing method, including:

determining a first HARQ-ACK bit from a first HARQ-ACK codebook according to information indicated by downlink control information DCI corresponding to the first HARQ-ACK codebook and/or indexes of carriers where physical downlink shared channels PDSCHs corresponding to the first HARQ-ACK codebook are located; and multiplexing the first HARQ-ACK bit and HARQ-ACK bits in a second HARQ-ACK codebook or discarding the first HARQ-ACK bit.

According to a second aspect, an embodiment of the present disclosure further provides a terminal, including:

a determining module, configured to determine a first HARQ-ACK bit from a first HARQ-ACK codebook according to information indicated by DCI corresponding to the first HARQ-ACK codebook and/or indexes of carriers where PDSCHs corresponding to the first HARQ-ACK codebook are located; and a processing module, configured to multiplex the first HARQ-ACK bit and HARQ-ACK bits in a second HARQ-ACK codebook or discarding the first HARQ-ACK bit.

According to a third aspect, an embodiment of the present disclosure further provides a terminal, including a processor, a memory, and a program stored in the memory and executable on the processor. When the program is executed by the processor, steps of the foregoing HARQ-ACK processing method are implemented.

In a fourth aspect, an embodiment of the present disclosure further provides a non-transitory computer-readable storage medium, where the non-transitory computer-readable storage medium stores a computer program. When the computer program is executed by a processor, steps of the foregoing HARQ-ACK processing method are implemented.

BRIEF DESCRIPTION OF DRAWINGS

It becomes clear for a person of ordinary skill in the art to learn various other advantages and benefits by reading description of the following optional implementations. Accompanying drawings are merely used for showing the optional implementations, and are not considered as a limitation on the present disclosure. In all accompanying drawings, a same reference symbol is used to indicate a same part. In the accompanying drawings.

DETAILED DESCRIPTION OF THE EMBODIMENTS

Figure 1A:
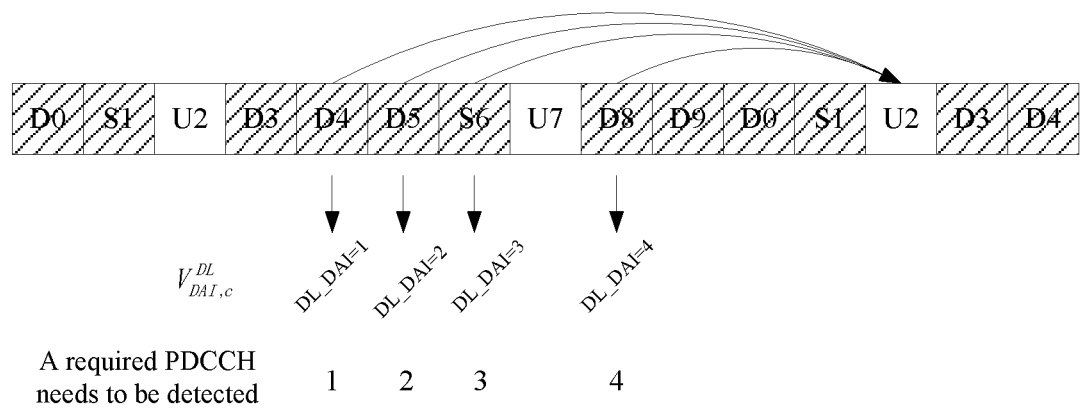
FIG. 1A and FIG. 1B are schematic diagrams of indicating a downlink DAI in LTE.
Figure 1B:
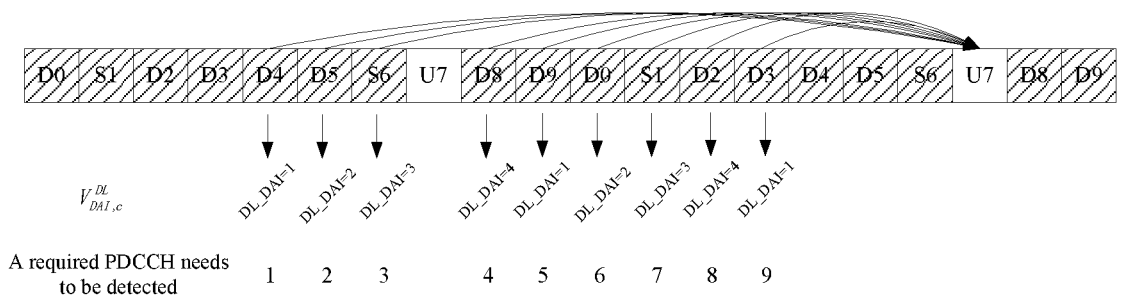

To better understand the embodiments of the present disclosure, the following technical points are first described:

1. Downlink control information (DCI):

The DCI is downlink control information carried by a physical downlink control channel (PDCCH) and delivered by a base station to a terminal. The DCI is used to indicate uplink and downlink resource allocation, hybrid automatic repeat request (HARQ) information, power control, and the like to the terminal.

2. Downlink assignment index (DAT):

(1) Counter DAI (C-DAI).

DCI used for downlink grant has a DAI field value indicating a quantity of PDCCHs with physical downlink shared channel (PDSCH) transmission that are sent until a current subframe in each configured serving cell or indicating a PDCCH released in downlink semi-persistent scheduling (SPS) (the subframe is located in a HARQ feedback window). The value is updated between subframes.

In other words, the DAI value indicates a quantity of pieces of downlink DCI that are sent until the current frame in a HARQ feedback window of a serving cell. The DAI value is a DAI value (see Table 1 for the mapping relationship, and the DAI value is also referred to as a counter DAI) in DCI detected by the terminal in a subframe n-$k_m$ of a serving cell c. $k_m$ is a minimum value of DCI detected in a set K, and $k_m$ corresponds to the last downlink subframe in a DCI format detected in the set K. If the terminal is only configured with one serving cell, c in $V_{DAI,c}^{DL}$ may be omitted.

It may be understood that the quantity of PDCCHs is counted herein, and scenarios of sending a PDSCH in an SPS subframe without a corresponding PDCCH are not counted. In addition, the quantity is a cumulative value.

TABLE 1

Value of downlink assignment index:

| Most significant bit (MSB) and least significant bit (LSB) of DAI | $V_{DAI}^{UL}$ or $V_{DAI}^{DL}$ | Number of subframes with PDSCH transmission and with a PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

(2) Total DAI:

When a HARQ-ACK and other uplink control information (UCI) (such as CSI) and uplink shared channels (UL-SCH) need to be transmitted on a PUSCH, a base station and a terminal maintain consistent understanding about a quantity of HARQ-ACK bits to be transmitted on an uplink and a quantity of physical resources to be occupied. This is scheduled by the base station, or implicitly determined in a protocol according to some rules. Based on this, the base station can correctly receive content of the UCI and/or UL-SCH of the PUSCH.

To achieve the objective, when the base station performs uplink scheduling and sends a PUSCH, DCI used for uplink grant carries another DAI field (that is, a total DAI field), to notify the terminal of a quantity of HARQ-ACK bits in current transmission.

3. HARQ-ACK codebook:

In a HARQ-ACK process supporting transport block-level (TB-level) feedback, each transport block (TB) corresponds to feedback of one HARQ-ACK bit, and supports a plurality of DL HARQ processes of each terminal and also supports a single DL HARQ process of each terminal. The terminal needs to indicate a capability of a minimum HARQ processing time (the minimum HARQ processing time is a minimum time required from downlink data reception to corresponding HARQ-ACK transmission timing). eMBB and URLLC support asynchronous and adaptive downlink HARQ.

From the perspective of the terminal, HARQ-ACKs of a plurality of PDSCHs may be transmitted in a data/control area of an UL in time for feedback, and form a HARQ-ACK codebook on the UL. DCI specifies timing (refer to a PDCSCH-to-HARQ timing indicator in DCI 1_0 and DCI 1_1) between PDSCH reception and corresponding acknowledgement (ACK)/negative-acknowledgment (NACK) (abbreviated as A/N below).

4. CBG transmission and CBG-based HARQ-ACK feedback:

During sending of each transport block (TB), the transport block is divided into a plurality of code blocks. A transmission mode of a code block group (CBG) is grouping CBs of a TB. The UE feeds back a HARQ-ACK of each CBG according to a reception status of the CBG.

A quantity of CBGs is configured through higher-layer radio resource control (RRC) signaling. After the UE configures the transmission mode of the CBG, the UE determines, according to a quantity of configured CBGs, a quantity of HARQ-ACK bits required for feedback of each TB, that is, a quantity of HARQ-ACK bits fed back for each TB is equal to the configured quantity of CBGs.

If the UE does not configure the transmission mode of the CBG, the quantity of HARQ-ACK bits fed back by the UE is a quantity of scheduled TBs, and has a maximum value of 2 bits.

If the UE configures the transmission mode of the CBG, the quantity of HARQ-ACK bits fed back=the configured quantity M of CBGs*the quantity N of scheduled TBs.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of the present disclosure shall fall within the protection scope of the present disclosure.

The term "include" and any other variants in the specification and claims of this application are intended to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

The technology described in this specification is not limited to the 5th-generation (5G) system and subsequent evolved communication systems as well as LTE/LTE-advanced (LTE-A) systems, and can also be applied to various wireless communication systems such as code division multiple access (CDMA), time division multiple access (TDMA), frequency division multiple access (FDMA), orthogonal frequency division multiple access (OFDMA), and single-carrier frequency-division multiple access (SC-FDMA) systems, and other systems.

The terms "system" and "network" are usually used interchangeably. The CDMA system can implement radio technologies such as CDMA2000 and universal terrestrial radio access (UTRA). UTRA includes wideband CDMA (WCDMA) and other CDMA variants. The TDMA system can implement radio technologies such as the global system for mobile communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are parts of a universal mobile telecommunications system (UMTS). LTE and more advanced LTE (such as LTE-A) are new UMTS versions that use E-UTRA. UTRA, E-UTRA, UMTS, LTE, LTE-A, and GSM are described in a document of an organization named "3rd Generation Partnership Project" (3GPP). CDMA2000 and UMB are described in a document of an origination named "3rd Generation Partnership Project 2" (3GPP2). The technology described in the present disclosure may also be used in the foregoing system and radio technology, and may also be used in another system and radio technology.

According to some mechanisms, if HARQ-ACK codebooks of different services are multiplexed, a HARQ-ACK bit of a high-priority service may be multiplexed to a resource fed back by a HARQ-ACK of a low-priority service, resulting in a transmission delay of a HARQ-ACK of the high-priority service. Alternatively, a HARQ-ACK bit of the low-priority service is multiplexed to a resource fed back by a HARQ-ACK of the high-priority service, resulting in reduced transmission reliability of the HARQ-ACK of the high-priority service.

Figure 2:
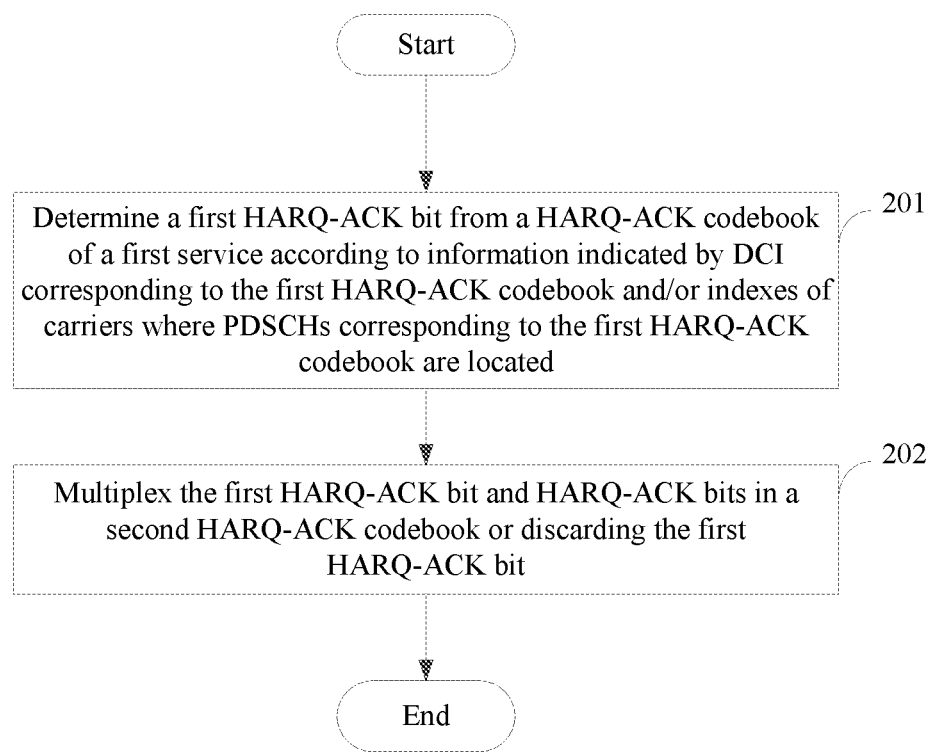
FIG. 2 is a first flowchart of a HARQ-ACK processing method according to an embodiment of the present disclosure.

Referring to FIG. 2, an embodiment of the present disclosure provides a HARQ-ACK processing method. The method is performed by a terminal, and includes: step 201 and step 202.

Step 201: Determine a first HARQ-ACK bit from a first HARQ-ACK codebook according to information indicated by DCI corresponding to the first HARQ-ACK codebook and/or indexes of carriers where PDSCHs corresponding to the first HARQ-ACK codebook are located.

Step 202: Multiplex the first HARQ-ACK bit and HARQ-ACK bits in a second HARQ-ACK codebook or discarding the first HARQ-ACK bit.

The first HARQ-ACK codebook may also be a HARQ-ACK codebook of a first service, and the second HARQ-ACK codebook may also be a HARQ-ACK codebook of a second service. Priorities of the first service and the second service may be different. For example, in some implementations, the priority of the first service is lower than that of the second service.

In the embodiments of the present disclosure, the second HARQ-ACK codebook and some HARQ-ACK bits in the first HARQ-ACK codebook may be multiplexed. While improving transmission efficiency of the HARQ-ACK of the first HARQ-ACK codebook, the transmission latency and reliability of the HARQ-ACK of the second HARQ-ACK codebook can be ensured.

Figure 3:
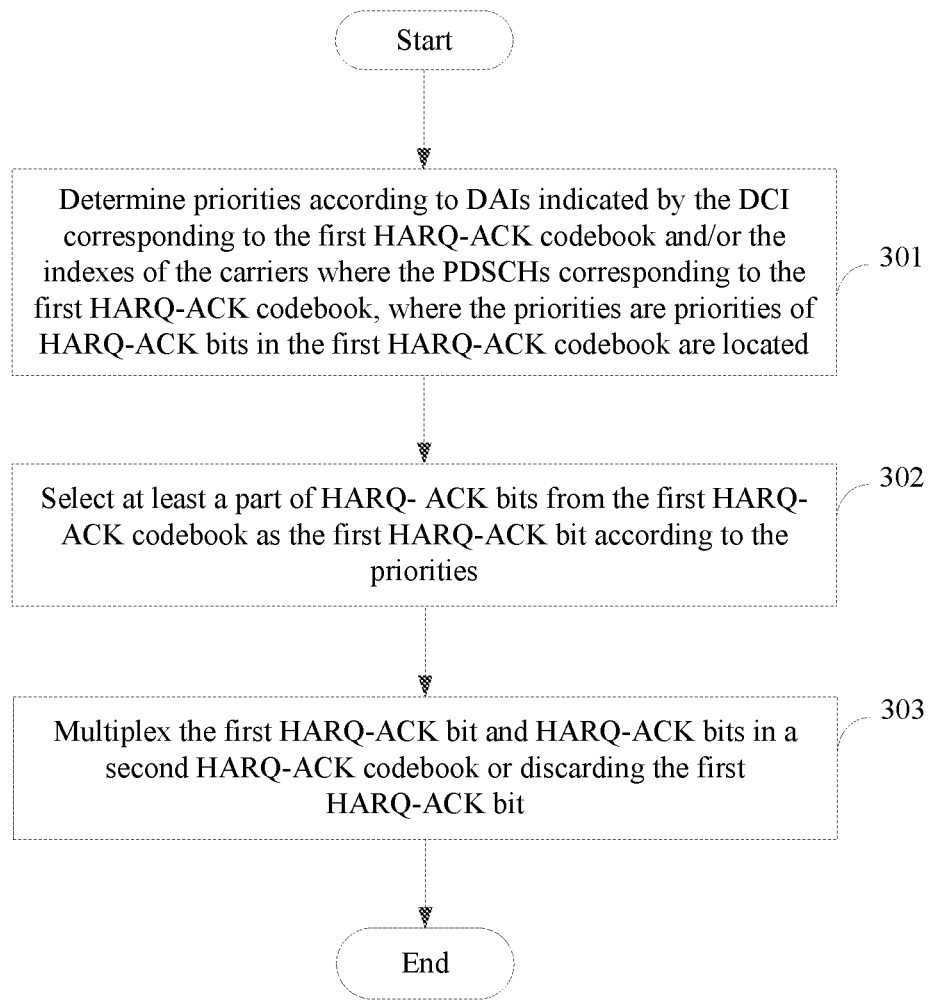
FIG. 3 is a second flowchart of a HARQ-ACK processing method according to an embodiment of the present disclosure.

Referring to FIG. 3, an embodiment of the present disclosure provides a HARQ-ACK processing method. The method is performed by a terminal, and includes: step 301, step 302, and step 303.

Step 301: Determine priorities according to DAIs indicated by the DCI corresponding to the first HARQ-ACK codebook and/or the indexes of the carriers where the PDSCHs corresponding to the first HARQ-ACK codebook are located, where the priorities are priorities of HARQ-ACK bits in the first HARQ-ACK codebook.

In some implementations, the priorities are determined according to an ascending order or a descending order of the DAIs indicated by the DCI corresponding to the first HARQ-ACK codebook and/or the indexes of the carriers where the PDSCHs corresponding to the first HARQ-ACK codebook are located.

Exemplarily, when the priorities are determined according to an ascending order or a descending order of the DAIs indicated by the DCI corresponding to the first HARQ-ACK codebook and/or the carrier indexes corresponding to the first HARQ-ACK codebook, priorities are first determined according to the carrier indexes. For example, a HARQ-ACK corresponding to a PDSCH with a small carrier index has a higher priority. If carrier indexes are the same, priorities are then determined according to the DAIs. For example, a HARQ-ACK corresponding to a PDSCH with a small DAI sequence number has a higher priority, or a HARQ-ACK corresponding to a PDSCH with a large DAI sequence number has a higher priority.

For example, when priorities are determined according to the carrier indexes corresponding to the first HARQ-ACK codebook, optionally:

1) If the carrier indexes are the same, a corresponding HARQ-ACK bit is selected according to an order of time domain resources of the PDSCHs.

That is, a HARQ-ACK corresponding to a PDSCH of an earlier time domain resource is selected.

2) If the carrier indexes are the same, a corresponding HARQ-ACK bit is selected according to an order of frequency domain resources of the PDSCHs.

That is, a HARQ-ACK corresponding to a PDSCH of a small or large frequency domain resource number is selected.

Step 302: Select at least a part of HARQ-ACK bits from the first HARQ-ACK codebook as the first HARQ-ACK bit according to the priorities.

In some implementations, at least some HARQ-ACK bits are selected from the first HARQ-ACK codebook as the first HARQ-ACK bit according to the priorities and a preset configuration.

Exemplarily, a bit with a high priority is selected as the first HARQ-ACK bit; or a bit with a low priority is selected as the first HARQ-ACK bit according to priorities.

Optionally, the preset configuration includes one or more of the following:

(1) a quantity of multiplexed HARQ-ACK bits, for example, a maximum quantity of multiplexed HARQ-ACK bits of different HARQ-ACK codebooks, or a maximum quantity of multiplexed HARQ-ACK bits of different services.

(2) a code rate of HARQ-ACK transmission, for example, a maximum code rate of a PUCCH resource carrying the second HARQ-ACK codebook for transmission, or a maximum code rate of a PUCCH resource carrying HARQ-ACK multiplexing.

(3) a time domain resource of HARQ-ACK transmission, for example, a time domain resource of a PUCCH resource carrying the second HARQ-ACK codebook for transmission, or a time domain resource of a PUCCH resource carrying HARQ-ACK multiplexing; and (4) a frequency domain resource of HARQ-ACK transmission, for example, a frequency domain resource of a PUCCH resource carrying the second HARQ-ACK codebook for transmission, or a frequency domain resource of a PUCCH resource carrying HARQ-ACK multiplexing.

It may be understood that the preset configuration can be configured by the network side, or can be agreed upon by a protocol.

Step 303: Multiplex the first HARQ-ACK bit and HARQ-ACK bits in a second HARQ-ACK codebook or discarding the first HARQ-ACK bit.

The first HARQ-ACK codebook may also be a HARQ-ACK codebook of a first service, and the second HARQ-ACK codebook may also be a HARQ-ACK codebook of a second service. Priorities of the first service and the second service may be different. For example, in some implementations, the priority of the first service is lower than that of the second service.

In some implementations, in a case of multiplexing the first HARQ-ACK bit and the HARQ-ACK bits in the second HARQ-ACK codebook (for example, before or after step 303 or at the same time as step 303), the method further includes: discarding HARQ-ACK bits other than the first HARQ-ACK bit in the first HARQ-ACK codebook.

In some implementations, in a case of discarding the first HARQ-ACK bit (for example, before or after step 303 or at the same time as step 303), the method further includes: multiplexing HARQ-ACK bits other than the first HARQ-ACK bit in the first HARQ-ACK codebook and the HARQ-ACK bits in the second HARQ-ACK codebook.

In some implementations, in a case of multiplexing the first HARQ-ACK bit and the HARQ-ACK bits in the second HARQ-ACK codebook (for example, before or after step 303 or at the same time as step 303), or in a case of discarding the first HARQ-ACK bit (for example, before or after step 303 or at the same time as step 303), the method further includes: after bit compression is performed on HARQ-ACK bits other than the first HARQ-ACK bit in the first HARQ-ACK codebook, multiplexing the HARQ-ACK bits other than the first HARQ-ACK bit in the first HARQ-ACK codebook and the HARQ-ACK bits in the second HARQ-ACK codebook.

In some implementations, the bit compression includes one or more of the following: code block group (CBG) compression (or referred to as CBG bundling) and spatial compression (or referred to as spatial bundling).

Optionally, the HARQ-ACK bit fed back based on a CBG is compressed, so that the HARQ-ACK bit is fed back based on a transport block (TB). For example, for a TB, a HARQ-ACK based on a CBG is 4 bits and is compressed into a TB-based HARQ-ACK that is 1 bit.

In the embodiments of the present disclosure, the second HARQ-ACK codebook and some HARQ-ACK bits in the first HARQ-ACK codebook may be multiplexed. While improving transmission efficiency of the HARQ-ACK of the first HARQ-ACK codebook, the transmission latency and reliability of the HARQ-ACK of the second HARQ-ACK codebook can be ensured.

Figure 4:
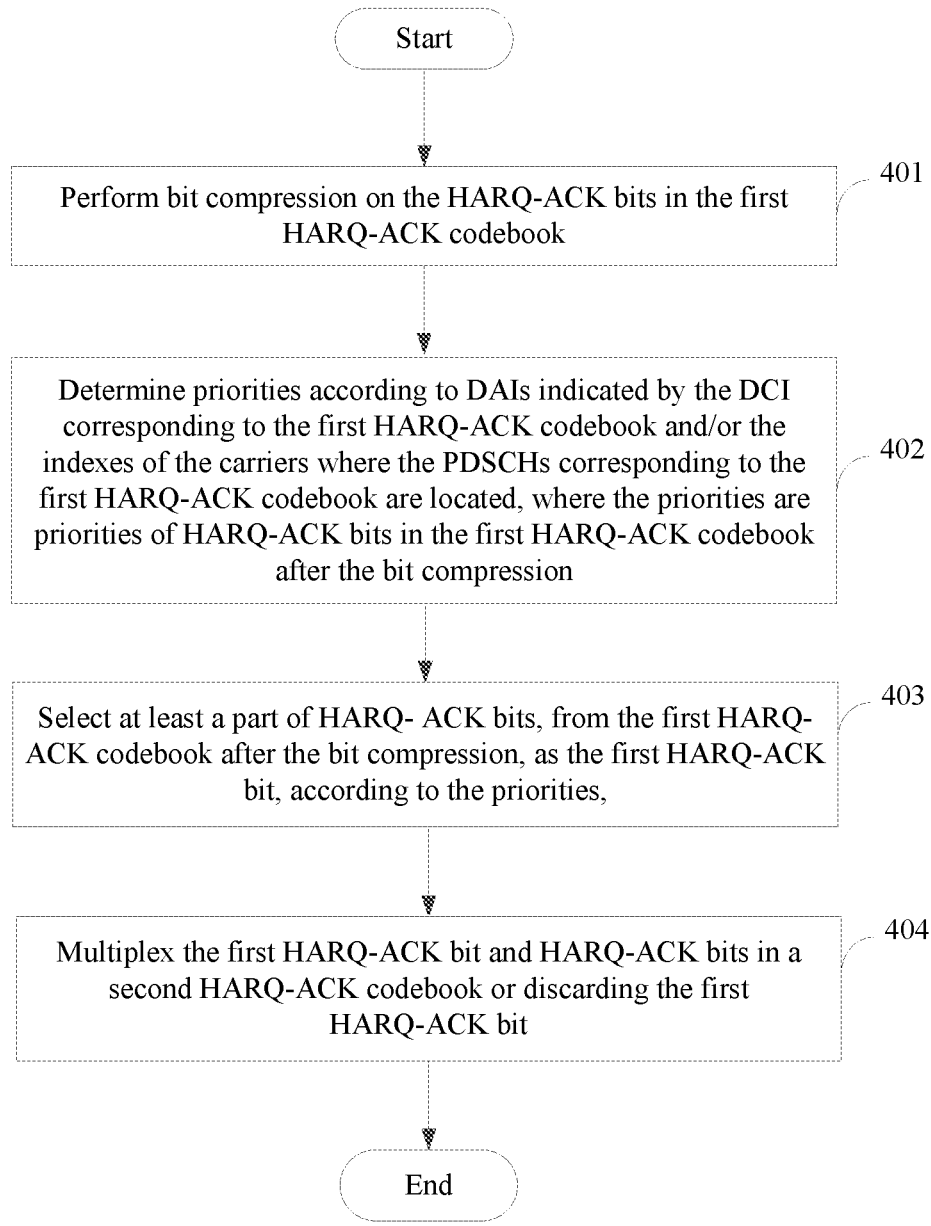
FIG. 4 is a third flowchart of a HARQ-ACK processing method according to an embodiment of the present disclosure.

Referring to FIG. 4, an embodiment of the present disclosure further provides a HARQ-ACK processing method. The method is performed by a terminal, and includes: step 401, step 402, step 403, and step 404.

Step 401: Perform bit compression on the HARQ-ACK bits in the first HARQ-ACK codebook.

Step 402: Determine priorities according to DAIs indicated by the DCI corresponding to the first HARQ-ACK codebook and/or the indexes of the carriers where the PDSCHs corresponding to the first HARQ-ACK codebook are located, where the priorities are priorities of HARQ-ACK bits in the first HARQ-ACK codebook after the bit compression.

In some implementations, the priorities are determined according to an ascending order or a descending order of the DAIs indicated by the DCI corresponding to the first HARQ-ACK codebook and/or an ascending order or a descending order of the indexes of the carriers where the PDSCHs corresponding to the first HARQ-ACK codebook are located.

Exemplarily, when the priorities are determined according to an ascending order or a descending order of the DAIs indicated by the DCI corresponding to the first HARQ-ACK codebook and/or the carrier indexes corresponding to the first HARQ-ACK codebook, priorities are first determined according to the carrier indexes. For example, a HARQ-ACK corresponding to a PDSCH with a small carrier index has a higher priority. If carrier indexes are the same, priorities are then determined according to the DAIs. For example, a HARQ-ACK corresponding to a PDSCH with a small DAI sequence number has a higher priority, or a HARQ-ACK corresponding to a PDSCH with a large DAI sequence number has a higher priority.

For example, when priorities are determined according to the carrier indexes corresponding to the first HARQ-ACK codebook, optionally:

1) If the carrier indexes are the same, a corresponding HARQ-ACK bit is selected according to an order of time domain resources of the PDSCHs.

That is, a HARQ-ACK corresponding to a PDSCH of an earlier time domain resource is selected.

2) If the carrier indexes are the same, a corresponding HARQ-ACK bit is selected according to an order of frequency domain resources of the PDSCHs.

That is, a HARQ-ACK corresponding to a PDSCH of a small or large frequency domain resource number is selected.

Step 403: Select at least a part of HARQ-ACK bits, from the first HARQ-ACK codebook after the bit compression, as the first HARQ-ACK bit, according to the priorities.

In some implementations, at least some HARQ-ACK bits are selected from the first HARQ-ACK codebook after the bit compression, as the first HARQ-ACK bit, according to the priorities and a preset configuration.

Exemplarily, a bit with a high priority is selected as the first HARQ-ACK bit; or a bit with a low priority is selected as the first HARQ-ACK bit according to priorities.

Optionally, the preset configuration includes one or more of the following:

(1) a quantity of multiplexed HARQ-ACK bits, for example, a maximum quantity of multiplexed HARQ-ACK bits of different services, or a maximum quantity of multiplexed HARQ-ACK bits of different services;

(2) a code rate of HARQ-ACK transmission, for example, a maximum code rate of a PUCCH resource carrying the second HARQ-ACK codebook for transmission, or a maximum code rate of a PUCCH resource carrying HARQ-ACK multiplexing;

(3) a time domain resource of HARQ-ACK transmission, for example, a time domain resource of a PUCCH resource carrying the second HARQ-ACK codebook for transmission, or a time domain resource of a PUCCH resource carrying HARQ-ACK multiplexing; and (4) a frequency domain resource of HARQ-ACK transmission, for example, a frequency domain resource of a PUCCH resource carrying the second HARQ-ACK codebook for transmission, or a frequency domain resource of a PUCCH resource carrying HARQ-ACK multiplexing.

It may be understood that the preset configuration can be configured by the network side, or can be agreed upon by a protocol.

Step 404: Multiplex the first HARQ-ACK bit and HARQ-ACK bits in a second HARQ-ACK codebook or discarding the first HARQ-ACK bit.

The first HARQ-ACK codebook may also be a HARQ-ACK codebook of a first service, and the second HARQ-ACK codebook may also be a HARQ-ACK codebook of a second service. Priorities of the first service and the second service are different. For example, in some implementations, the priority of the first service is lower than that of the second service.

In some implementations, in a case of multiplexing the first HARQ-ACK bit and the HARQ-ACK bits in the second HARQ-ACK codebook (for example, before or after step 404 or at the same time as step 404), the method further includes: discarding HARQ-ACK bits other than the first HARQ-ACK bit in the first HARQ-ACK codebook.

In some implementations, in a case of discarding the first HARQ-ACK bit (for example, before or after step 404 or at the same time as step 404), the method further includes: multiplexing HARQ-ACK bits other than the first HARQ-ACK bit in the first HARQ-ACK codebook and the HARQ-ACK bits in the second HARQ-ACK codebook.

In some implementations, the bit compression includes one or more of the following: CBG compression and spatial compression.

Optionally, the HARQ-ACK bit fed back based on a CBG is compressed, so that the HARQ-ACK bit is fed back based on a transport block (TB). For example, a HARQ-ACK based on a CBG is 4 bits and is compressed into a TB-based HARQ-ACK that is 1 bit.

In the embodiments of the present disclosure, the second HARQ-ACK codebook and some HARQ-ACK bits in the first HARQ-ACK codebook may be multiplexed. While improving transmission efficiency of the HARQ-ACK of the first HARQ-ACK codebook, the transmission latency and reliability of the HARQ-ACK of the second HARQ-ACK codebook can be ensured.

The following uses a service 1 (or referred to as a first service) and a service 2 (or referred to as a second service) as an example, to describe the implementation of the HARQ-ACK processing method of the embodiments of the present disclosure.

Exemplarily, the service 1 and the service 2 correspond to a HARQ-ACK codebook 1 and a HARQ-ACK codebook 2 respectively, where the service 1 is a low-priority service and the service 2 is a high-priority service.

When the base station schedules UE for transmission of the service 1 and the service 2 at the same time, a resource allocated by the base station for transmission of a HARQ-ACK codebook 1 of the service 1 is a PUCCH 1; and a resource allocated by the base station for transmission of a HARQ-ACK codebook 2 of the service 2 is a PUCCH 2.

The UE multiplexes the HARQ-ACK codebook 2 of the service 2 and the HARQ-ACK codebook 1 of the service 1. The UE determines a priority of and/or performs bit compression on the HARQ-ACK bit of the service 1 (that is, a low-priority service) according to the following method, selects a corresponding HARQ-ACK bit according to a preset configuration, and may perform the following processing on the selected HARQ-ACK bit:

1) The selected HARQ-ACK bit and the HARQ-ACK of the service 2 are multiplexed, and the remaining HARQ-ACK bit of the service 1 is discarded.

2) The selected HARQ-ACK bit is discarded, and the remaining HARQ-ACK bit of the service 1 and the HARQ-ACK of the service 2 are multiplexed.

In some implementations, priority sorting and selecting manners include at least one of the following:

Optional manner 1: The UE selects a HARQ-ACK bit from the HARQ-ACK codebook 1 according to a DAI indicated by DCI for scheduling data transmission of the service 1.

Exemplarily, the UE selects a HARQ-ACK bit corresponding to a counter DAI or a total DAI with a small sequence number.

Optional manner 2: The UE selects a HARQ-ACK bit from the HARQ-ACK codebook 1 according to an index of a carrier where a PDSCH for data transmission of the service 1 is located.

Exemplarily, the UE selects a HARQ-ACK bit corresponding to a small or a large carrier index for multiplexing.

If the carrier indexes are the same, a corresponding HARQ-ACK bit is selected according to an order of time domain resources of the PDSCHs. That is, a HARQ-ACK corresponding to a PDSCH of an earlier time domain resource is selected.

Alternatively, if the carrier indexes are the same, a corresponding HARQ-ACK bit is selected according to an order of frequency domain resources of the PDSCHs. That is, a HARQ-ACK corresponding to a PDSCH of a small or large frequency domain resource number is selected.

In some implementations, a bit compression manner of the HARQ-ACK bit includes:

Optional manner 1: Perform spatial bundling on the HARQ-ACK codebook 1 of the service 1, then select at least some HARQ-ACK bits from the HARQ-ACK codebook 1 of the service 1 according to the priorities determined in the above manner, multiplex the selected HARQ-ACK bits and the service 2, and discard the remaining HARQ-ACK bit.

Optional manner 2: Perform selection according to the priorities, discard the selected HARQ-ACK bits, perform spatial bundling on the remaining HARQ-ACK bit, and multiplex the remaining HARQ-ACK bit and the service 2.

Optional manner 3: Perform selection according to the priorities, multiplex the selected HARQ-ACK bits and the service 2, perform spatial bundling on the remaining HARQ-ACK bit, and multiplex the remaining HARQ-ACK bit and the service 2.

Optional manner 4: If a HARQ-ACK of the service 1 is fed back based on a CBG:

(1) Perform CBG bundling on the HARQ-ACK codebook 1 of the service 1, that is, the HARQ-ACK codebook 1 is bundled into a TB for feedback, then perform selection according to the priorities, and multiplex the selected HARQ-ACK bit with the service 2.

(2) Perform selection on the HARQ-ACK codebook 1 of the service 1 according to the priorities, multiplex the selected HARQ-ACK bit and the service 2, perform CBG bundling on the remaining HARQ-ACK bit, that is, the remaining HARQ-ACK bit is bundled into a TB feedback, and then multiplex the HARQ-ACK bit on which CBG bundling is performed and the service 2.

In some implementations, the preset configuration includes one or more of the following:

(1) a quantity of multiplexed HARQ-ACK bits, for example, a maximum quantity of multiplexed HARQ-ACK bits of different HARQ-ACK codebooks, or a maximum quantity of multiplexed HARQ-ACK bits of different services;

(2) a code rate of HARQ-ACK transmission, for example, a maximum code rate of a PUCCH resource carrying the second HARQ-ACK codebook for transmission, or a maximum code rate of a PUCCH resource carrying HARQ-ACK multiplexing;

(3) a time domain resource of HARQ-ACK transmission, for example, a time domain resource of a PUCCH resource carrying the second HARQ-ACK codebook for transmission, or a time domain resource of a PUCCH resource carrying HARQ-ACK multiplexing; and (4) a frequency domain resource of HARQ-ACK transmission, for example, a frequency domain resource of a PUCCH resource carrying the second HARQ-ACK codebook for transmission, or a frequency domain resource of a PUCCH resource carrying HARQ-ACK multiplexing.

The following uses an example in which the UE multiplexes a HARQ-ACK codebook of a high-priority service and a HARQ-ACK codebook of a low-priority service for description.

For example, the UE may determine a priority of and/or perform bit compression on a HARQ-ACK bit of a low-priority service according to the manner in the following embodiment 1 to embodiment 6, then select a corresponding HARQ-ACK bit according to a preset configuration, and multiplex or discard the selected HARQ-ACK bit.

Manners of selecting the HARQ-ACK bit may include the following two types:

Manner 1: The UE selects a HARQ-ACK bit for multiplexing from a HARQ-ACK codebook of a low-priority service according to a DAI indicated by DCI for scheduling data transmission of the low-priority service.

Manner 2: The UE selects a HARQ-ACK bit for multiplexing from the HARQ-ACK codebook of a low-priority service according to an index of a carrier where a PDSCH for data transmission of the low-priority service is located.

The following describes the implementation of processing a HARQ-ACK in embodiments of the present disclosure in detail with reference to embodiment 1 to embodiment 6.

Embodiment 1

Figure 5:
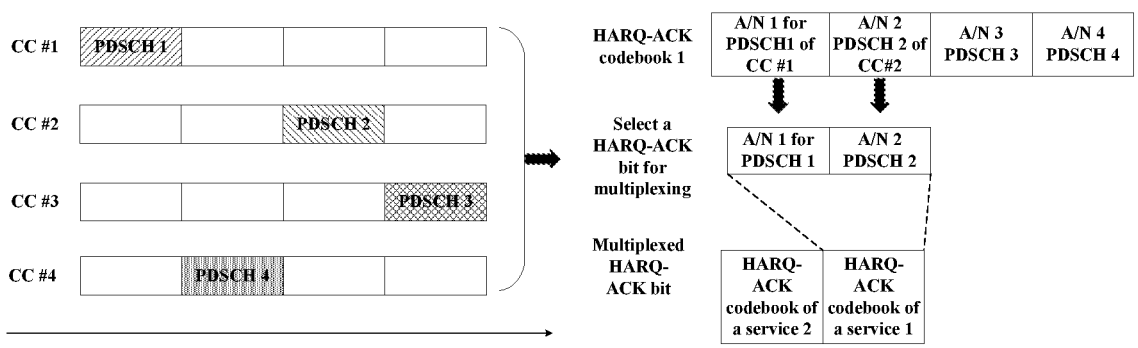
FIG. 5 is a first schematic diagram of multiplexing a HARQ-ACK bit of a high-priority service and some HARQ-ACK bits of a low-priority service according to an embodiment of the present disclosure.

Referring to FIG. 5, the UE multiplexes a HARQ-ACK codebook 2 of a service 2 (or referred to as a second service) and a HARQ-ACK codebook 1 of a service 1 (or referred to as a first service).

The UE determines the priority of the HARQ-ACK bit according to a carrier (or referred to as a component carrier (CC)) number of a PDSCH for data transmission of the service 1. A HARQ-ACK corresponding to a PDSCH with a smaller carrier index has a higher priority.

According to the priority of the HARQ-ACK bit, A/N 1 (corresponding to CC #1) corresponding to PDSCH 1 and A/N 2 (corresponding to CC #1) corresponding to PDSCH 2 are selected from the HARQ-ACK codebook 1, and are multiplexed with the HARQ-ACK codebook 2 of the service 2.

In this embodiment, each A/N is 1 bit, and it is assumed that a maximum quantity of bits for HARQ-ACK multiplexing of a low-priority service is 2.

It may be understood that in the multiplexed HARQ-ACK codebook, the order of the HARQ-ACK codebooks of the service 1 and the service 2 is not restricted. The following embodiment 2 to embodiment 6 are similar, and details are no longer repeated in other embodiments.

Embodiment 2

Figure 6:
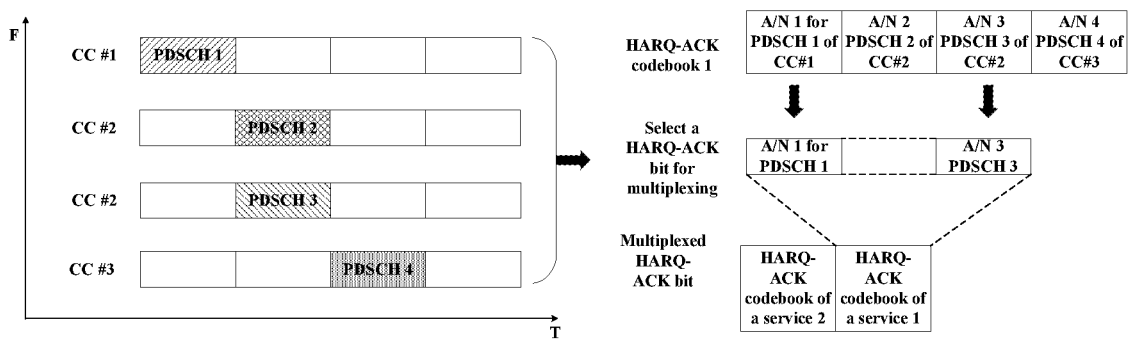
FIG. 6 is a second schematic diagram of multiplexing a HARQ-ACK bit of a high-priority service and some HARQ-ACK bits of a low-priority service according to an embodiment of the present disclosure.

Referring to FIG. 6, the UE multiplexes the HARQ-ACK codebook 2 of the service 2 and the HARQ-ACK codebook 1 of the service 1.

The UE determines a priority of a HARQ-ACK bit according to the index of the carrier where the PDSCH for data transmission of the service 1 is located and the frequency domain resource number of the PDSCH. A HARQ-ACK corresponding to a PDSCH with a small carrier index has a high priority. If carrier indexes are the same, a HARQ-ACK corresponding to a PDSCH with a small frequency domain resource number has a high priority.

According to the priority of the HARQ-ACK bit, A/N 1 (corresponding to CC #1) corresponding to PDSCH 1 and A/N 3 (corresponding to CC #2, a frequency domain resource number is small) corresponding to PDSCH 3 are selected from the HARQ-ACK codebook 1, and are multiplexed with the HARQ-ACK codebook 2 of the service 2.

In this embodiment, each A/N is 1 bit, and it is assumed that a maximum quantity of bits for HARQ-ACK multiplexing of a low-priority service is 2.

Embodiment 3

Figure 7:
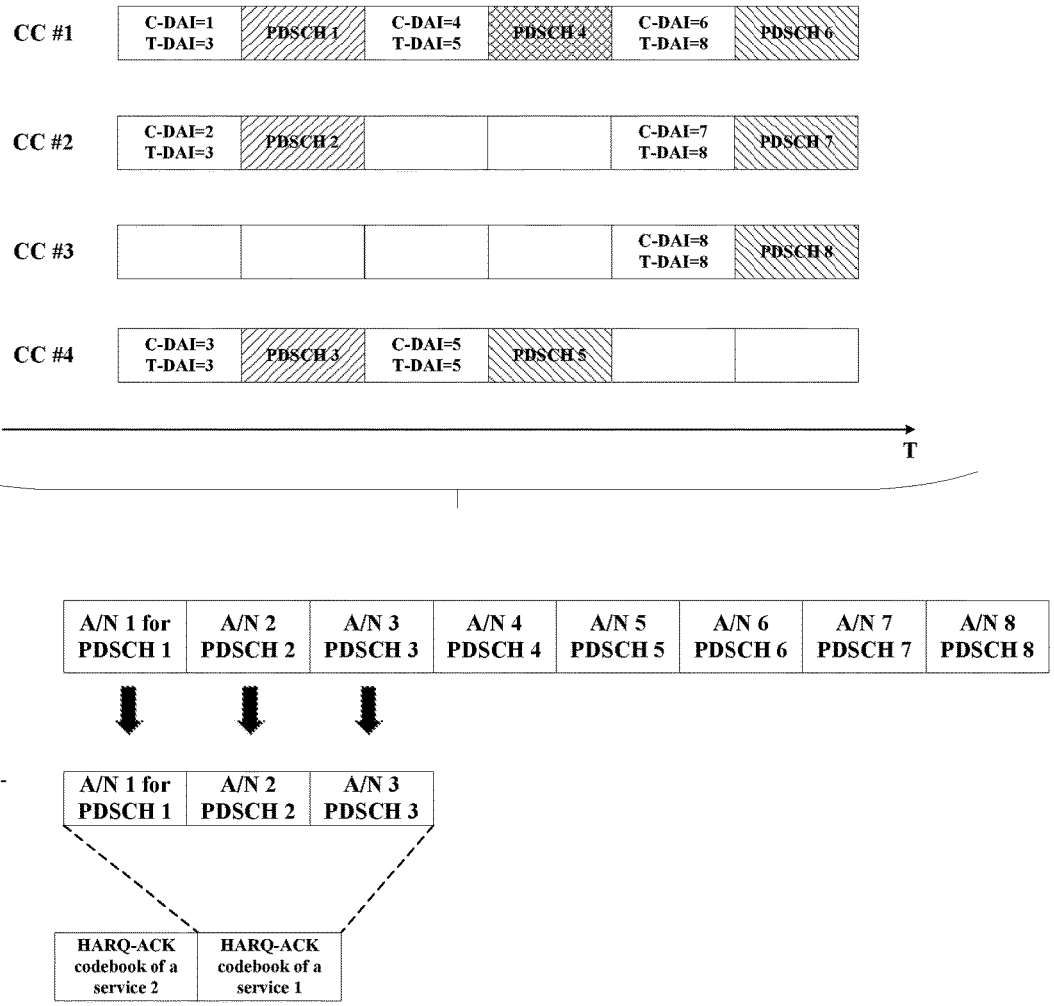
FIG. 7 is a third schematic diagram of multiplexing a HARQ-ACK bit of a high-priority service and some HARQ-ACK bits of a low-priority service according to an embodiment of the present disclosure.

Referring to FIG. 7, the UE multiplexes the HARQ-ACK codebook 2 of the service 2 and the HARQ-ACK codebook 1 of the service 1.

The UE determines the priority of the HARQ-ACK bit according to a C-DAI and a T-DAI indicated by DCI for scheduling transmission of the service 1. A HARQ-ACK corresponding to a PDSCH with a small DAI sequence number has a higher priority.

According to the priority of the HARQ-ACK bit, A/N 1 (corresponding to CC #1, C-DAI=1 and T-DAI=3) corresponding to PDSCH 1, A/N 2 (corresponding to CC #2, C-DAI=2 and T-DAI=3) corresponding to PDSCH 2, and A/N 3 (corresponding to CC #4, C-DAI=3 and T-DAI=3) corresponding to PDSCH 3 are selected from the HARQ-ACK codebook 1, and are multiplexed with the HARQ-ACK codebook 2 of the service 2.

In this embodiment, each A/N is 1 bit, and it is assumed that a maximum quantity of bits for HARQ-ACK multiplexing of a low-priority service is 3.

If DCI for scheduling a PDSCH is not detected and the UE selects the corresponding HARQ-ACK for multiplexing (in this case, the UE may predict a DAI indicated by the DCI that is not detected), the UE fills the selected HARQ-ACK bit with NACK.

Embodiment 4

Figure 8:
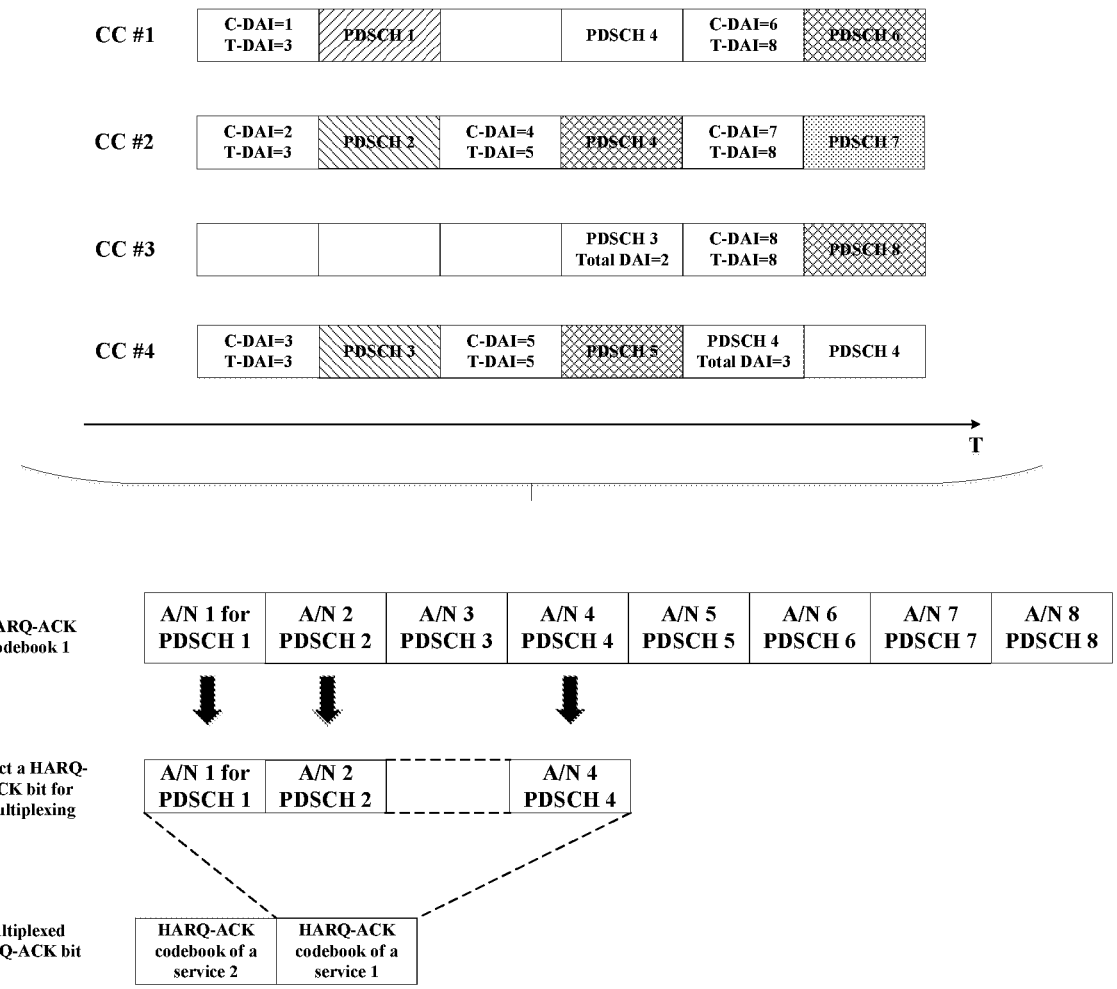
FIG. 8 is a fourth schematic diagram of multiplexing a HARQ-ACK bit of a high-priority service and some HARQ-ACK bits of a low-priority service according to an embodiment of the present disclosure.

Referring to FIG. 8, the UE multiplexes the HARQ-ACK codebook 2 of the service 2 and the HARQ-ACK codebook 1 of the service 1.

The UE determines a priority of a HARQ-ACK bit according to the index of the carrier where the PDSCH for data transmission of the service 1 is located and a T-DAI indicated by DCI for scheduling transmission of the service 1. A HARQ-ACK corresponding to a PDSCH with a small carrier index has a high priority. If carrier indexes are the same, a HARQ-ACK corresponding to a PDSCH with a small T-DAI sequence number has a high priority.

According to the priority of the HARQ-ACK bit, A/N 1 (corresponding to CC #1, T-DAI=3) corresponding to PDSCH 1, A/N 2 (corresponding to CC #2, T-DAI=3) corresponding to PDSCH 2, and A/N 4 (corresponding to CC #2, T-DAI=5) corresponding to PDSCH 4 are selected from the HARQ-ACK codebook 1, and are multiplexed with the HARQ-ACK codebook 2 of the service 2.

In this embodiment, each A/N is 1 bit, and it is assumed that a maximum quantity of bits for HARQ-ACK multiplexing of a low-priority service is 3.

Embodiment 5

Figure 9:
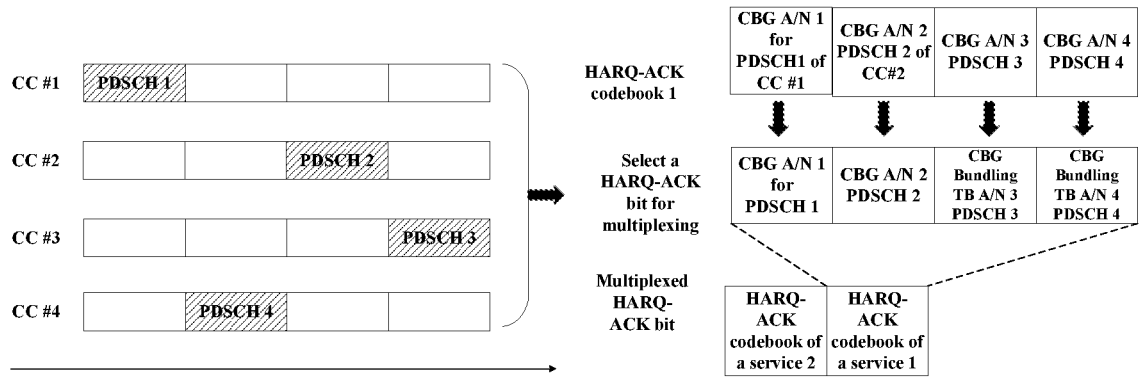
FIG. 9 is a fifth schematic diagram of multiplexing a HARQ-ACK bit of a high-priority service and some HARQ-ACK bits of a low-priority service according to an embodiment of the present disclosure.

Referring to FIG. 9, the UE multiplexes the HARQ-ACK codebook 2 of the service 2 and the HARQ-ACK codebook 1 of the service 1.

The UE determines the priority of the HARQ-ACK bit according to an index of a carrier where a PDSCH for data transmission of the service 1 is located. A HARQ-ACK corresponding to a PDSCH with a smaller carrier index has a higher priority. A HARQ-ACK codebook of the service 1 is fed back based on a CBG.

According to the priority of the HARQ-ACK bit, CBG A/N 1 (corresponding to CC #1) corresponding to PDSCH 1 and CBG A/N 2 (corresponding to CC #1) corresponding to PDSCH 2 are selected from the HARQ-ACK codebook 1. In addition, after the CBG A/N 3 corresponding to PDSCH 3 (corresponding to CC #3) and CBG A/N 4 corresponding to PDSCH 4 (corresponding to CC #4) are bundled into a TB for feedback, the foregoing HARQ-ACK bits are directly multiplexed with the HARQ-ACK codebook 2 of the service 2.

In this embodiment, each TB A/N is 1 bit and CBG A/N is 4 bits, and it is assumed that a maximum quantity of bits for HARQ-ACK multiplexing of a low-priority service is 10.

Embodiment 6

Figure 10:
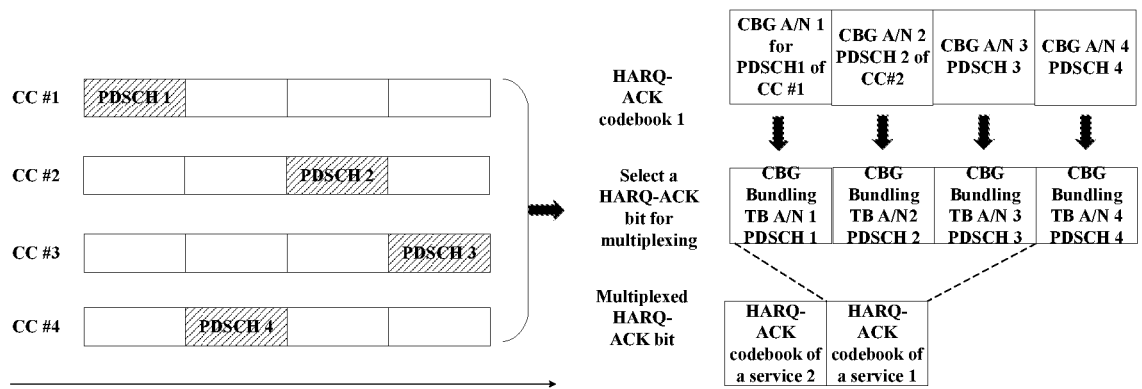
FIG. 10 is a sixth schematic diagram of multiplexing a HARQ-ACK bit of a high-priority service and some HARQ-ACK bits of a low-priority service according to an embodiment of the present disclosure.

Referring to FIG. 10, in this embodiment, the UE multiplexes the HARQ-ACK codebook 2 of the service 2 and the HARQ-ACK codebook 1 of the service 1.

The UE determines the priority of the HARQ-ACK bit according to an index of a carrier where a PDSCH for data transmission of the service 1 is located. A HARQ-ACK corresponding to a PDSCH with a smaller carrier index has a higher priority. A HARQ-ACK codebook of the service 1 is fed back based on a CBG.

According to the priority of the HARQ-ACK bit, after CBG A/N 1 (corresponding to CC #1) corresponding to PDSCH 1, CBG A/N 2 (corresponding to CC #1) corresponding to PDSCH 2, CBG A/N 3 corresponding to PDSCH 3 (corresponding to CC #3), and CBG A/N 4 corresponding to PDSCH 4 (corresponding to CC #4) in the HARQ-ACK codebook 1 are bundled into a TB for feedback, TB A/N 1 (corresponding to CC #1) corresponding to PDSCH 1, TB A/N 2 (corresponding to CC #1) corresponding to PDSCH 2, and TB A/N 3 corresponding to PDSCH 3 (corresponding to CC #3) are selected for directly multiplexing with the HARQ-ACK codebook 2 of the service 2.

In this embodiment, each TB A/N is 1 bit and CBG A/N is 4 bits, and it is assumed that a maximum quantity of bits for HARQ-ACK multiplexing of a low-priority service is 3.

The embodiments of the present disclosure further provide a terminal. A problem resolution principle of the terminal is similar to that of the HARQ-ACK processing method in the embodiments of the present disclosure. Therefore, for implementation of the terminal, refer to the implementation of the method. Repetitions are not provided herein.

Figure 11:
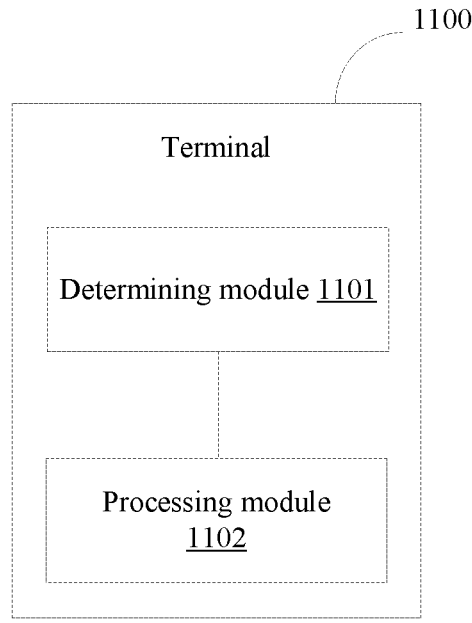
FIG. 11 is a first schematic diagram of a terminal according to an embodiment of the present disclosure.

Referring to FIG. 11, an embodiment of the present disclosure further provides a terminal. The terminal 1100 includes:

a determining module 1101, configured to determine a first HARQ-ACK bit from a first HARQ-ACK codebook according to information indicated by DCI corresponding to the first HARQ-ACK codebook and/or indexes of carriers where PDSCHs corresponding to the first HARQ-ACK codebook are located; and a processing module 1102, configured to multiplex the first HARQ-ACK bit and HARQ-ACK bits in a second HARQ-ACK codebook or discarding the first HARQ-ACK bit.

In some implementations, the determining module 1101 includes:

a first determining unit, configured to determine priorities according to DAIs indicated by the DCI corresponding to the first HARQ-ACK codebook and/or the indexes of the carriers where the PDSCHs corresponding to the first HARQ-ACK codebook are located, where the priorities are priorities of HARQ-ACK bits in the first HARQ-ACK codebook; and a first selection unit, configured to select at least a part of HARQ-ACK bits from the first HARQ-ACK codebook as the first HARQ-ACK bit according to the priorities.

In some implementations, the first selection unit is further configured to: select at least a part of HARQ-ACK bits from the first HARQ-ACK codebook as the first HARQ-ACK bit according to the priorities and a preset configuration.

In some implementations, the determining module 1101 includes:

a bit compression unit, configured to perform bit compression on the HARQ-ACK bits in the first HARQ-ACK codebook;

a second determining unit, configured to determine priorities according to DAIs indicated by the DCI corresponding to the first HARQ-ACK codebook and/or the indexes of the carriers where the PDSCHs corresponding to the first HARQ-ACK codebook are located, where the priorities are priorities of HARQ-ACK bits in the first HARQ-ACK codebook after the bit compression; and a second selection unit, configured to select at least a part of HARQ-ACK bits, from the first HARQ-ACK codebook after the bit compression, as the first HARQ-ACK bit, according to the priorities.

In some implementations, the second selection unit is further configured to: select at least a part of HARQ-ACK bits, from the first HARQ-ACK codebook after the bit compression, as the first HARQ-ACK bit, according to the priorities and a preset configuration.

In some implementations, the first determining unit or the second determining unit is further configured to: determine the priorities according to an ascending order or a descending order of the DAIs indicated by the DCI corresponding to the first HARQ-ACK codebook and/or the indexes of the carriers where the PDSCHs corresponding to the first HARQ-ACK codebook are located.

In some implementations, the processing module 1102 is further configured to: in a case of multiplexing the first HARQ-ACK bit and the HARQ-ACK bits in the second HARQ-ACK codebook, discard HARQ-ACK bits other than the first HARQ-ACK bit in the first HARQ-ACK codebook.

In some implementations, the processing module 1102 is further configured to: in a case of discarding the first HARQ-ACK bit, multiplex HARQ-ACK bits other than the first HARQ-ACK bit in the first HARQ-ACK codebook and the HARQ-ACK bits in the second HARQ-ACK codebook.

In some implementations, the processing module 1102 is further configured to: in a case of multiplexing the first HARQ-ACK bit and the HARQ-ACK bits in the second HARQ-ACK codebook, or in a case of discarding the first HARQ-ACK bit, after bit compression is performed on HARQ-ACK bits other than the first HARQ-ACK bit in the first HARQ-ACK codebook, multiplex the HARQ-ACK bits other than the first HARQ-ACK bit in the first HARQ-ACK codebook and the HARQ-ACK bits in the second HARQ-ACK codebook.

In some implementations, the bit compression includes one or more of the following: CBG compression and spatial compression.

In some implementations, the preset configuration includes one or more of the following:

(1) a quantity of multiplexed HARQ-ACK bits, for example, a maximum quantity of multiplexed HARQ-ACK bits of different HARQ-ACK codebooks, or a maximum quantity of multiplexed HARQ-ACK bits of different services;

(2) a code rate of HARQ-ACK transmission, for example, a maximum code rate of a PUCCH resource carrying the second HARQ-ACK codebook for transmission, or a maximum code rate of a PUCCH resource carrying HARQ-ACK multiplexing;

(3) a time domain resource of HARQ-ACK transmission, for example, a time domain resource of a PUCCH resource carrying the second HARQ-ACK codebook for transmission, or a time domain resource of a PUCCH resource carrying HARQ-ACK multiplexing; and (4) a frequency domain resource of HARQ-ACK transmission, for example, a frequency domain resource of a PUCCH resource carrying the second HARQ-ACK codebook for transmission, or a frequency domain resource of a PUCCH resource carrying HARQ-ACK multiplexing.

The terminal provided in this embodiment of the present disclosure may perform the foregoing embodiment. An implementation principle and a technical effect of the terminal are similar to those of the embodiment, and details are not described again in this embodiment.

Figure 12:
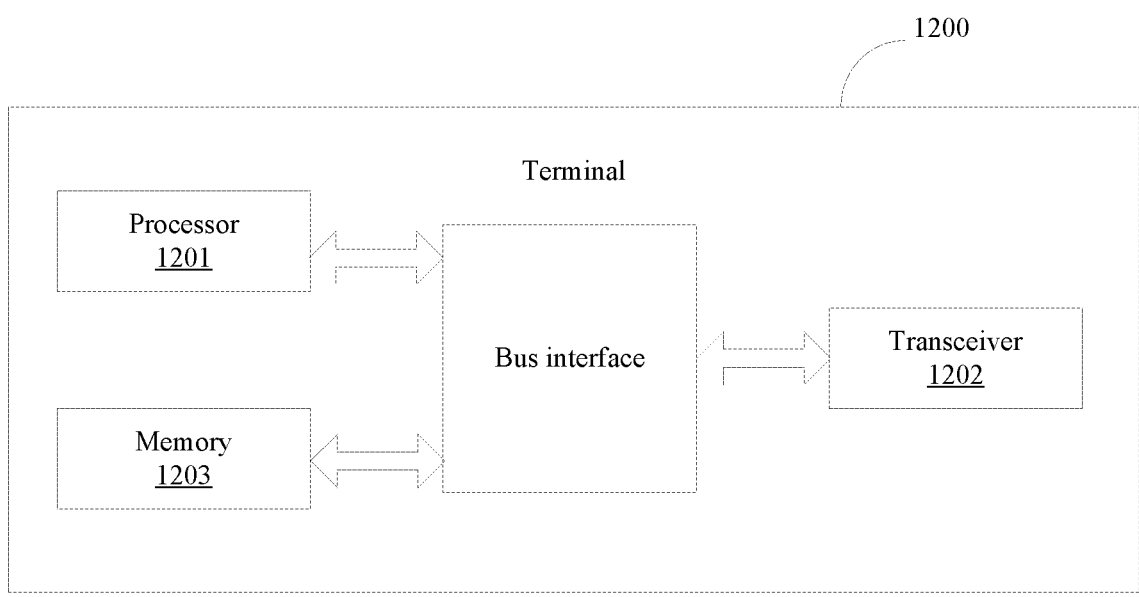
FIG. 12 is a second schematic diagram of a terminal according to an embodiment of the present disclosure.

Referring to FIG. 12, FIG. 12 is a structural diagram of a terminal applied in an embodiment of the present disclosure. As shown in FIG. 12, the terminal 1200 includes: a processor 1201, a transceiver 1202, a memory 1203, and a bus interface, where the processor 1201 may be responsible for bus architecture management and general processing. The memory 1203 may store data used by the processor 1201 when the processor 1201 performs an operation.

In an embodiment of the present disclosure, the terminal 1200 further includes: a computer program stored in the memory 1203 and executable on the processor 1201. The computer program implements steps of the above method when executed by the processor 1201.

In FIG. 12, the bus architecture may include any quantity of interconnected buses and bridges, which are connected together by various circuits of one or more processors represented by the processor 1201 and a memory represented by the memory 1203. The bus architecture may further link various other circuits such as a peripheral device, a voltage regulator, and a power management circuit together. These are all well-known in the art, and therefore are not described in this specification. The bus interface provides an interface. The transceiver 1202 may be a plurality of components, that is, include a transmitter and a receiver, and provide a unit for communicating with various other apparatuses on a transmission medium.

The terminal provided in this embodiment of the present disclosure may perform the foregoing method embodiment. An implementation principle and a technical effect of the terminal are similar thereto, and details are not described herein again in this embodiment.

The method or algorithm steps described in combination with content disclosed in the present disclosure may be implemented by hardware, or may be implemented by a processor by executing software instructions. The software instruction may be formed by a corresponding software module. The software module may be stored in a random access memory (RAM), a flash memory, a memory (ROM), and an erasable programmable read-only memory (EPROM), an electrically erasable programmable read-only memory (EEPROM), a register, a hard disk, a mobile hard disk, a compact disc read-only memory, or a storage medium of any other form known in the art. An exemplary storage medium is coupled to the processor, so that the processor can read information from the storage medium and can write information to the storage medium. Certainly, the storage medium may also be an integral part of the processor. The processor and the storage medium may be carried in an application specific integrated circuit (ASIC). In addition, the ASIC may be carried in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a non-transitory computer readable medium or transmitted as one or more instructions or code in the non-transitory computer readable medium. The non-transitory computer readable medium includes a computer storage medium and a communications medium, where the communications medium includes any medium that enables a computer program to be transmitted from one place to another. The storage medium may be any usable medium accessible to a general-purpose or dedicated computer.

The objectives, technical solutions, and beneficial effects of the present disclosure are described in detail in the foregoing implementations. It should be understood that the foregoing descriptions are merely specific implementations of the present disclosure, and are not intended to limit the protection scope of the present disclosure. Any modification, equivalent replacement, or improvement made on the basis of the technical solutions of the present disclosure shall fall within the protection scope of the present disclosure.

A person skilled in the art should understand that the embodiments of the present disclosure can be provided as a method, a system, or a computer program product. Therefore, the embodiments of the present disclosure may take the form of a hardware only embodiment, a software only embodiment, or an embodiment with both software and hardware. Moreover, the embodiments of the present disclosure may use a form of a computer program product that is implemented on one or more computer-usable storage media (including but are not limited to a magnetic disk memory, a CD-ROM, an optical memory, and the like) that include computer-usable program code.

The embodiments of the present disclosure are described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a dedicated computer, an embedded processor, or another programmable data processing device to produce a machine, so that instructions executed by a processor of a computer or another programmable data processing device produce an apparatus for implementing a function specified in one or more processes of the flowchart and/or one or more blocks of the block diagram.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operation steps are performed on the computer or the another programmable device to produce computer-implemented processing, thereby providing instructions executed on the computer or the another programmable device to implement the function specified in one or more processes of the flowchart and/or one or more blocks of the block diagram.

Obviously, a person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

What is claimed is:

1. A hybrid automatic repeat request acknowledgement (HARQ-ACK) processing method, comprising:
   determining priorities of HARQ-ACK bits in a first HARQ-ACK codebook according to at least one of downlink assignment indexes (DAIs) indicated by downlink control information (DCI) corresponding to the first HARQ-ACK codebook or indexes of carriers where physical downlink shared channels (PDSCHs) corresponding to the first HARQ-ACK codebook are located;
   selecting at least a part of the HARQ-ACK bits as a first HARQ-ACK bit from the first HARQ-ACK codebook according to the priorities of the HARQ-ACK bits in the first HARQ-ACK codebook and a preset configuration comprising a quantity of multiplexed HARQ-ACK bits;
   performing at least one of: discarding the first HARQ-ACK bit; or
   multiplexing the first HARQ-ACK bit with HARQ-ACK bits in a second HARQ-ACK codebook, wherein a priority of the first HARQ-ACK codebook is lower than a priority of the second HARQ-ACK codebook; and
   after bit compression is performed on HARQ-ACK bits other than the first HARQ-ACK bit in the first HARQ-ACK codebook, multiplexing the bit-compressed HARQ-ACK bits other than the first HARQ-ACK bit in the first HARQ-ACK codebook with the HARQ-ACK bits in the second HARQ-ACK codebook.

2. The method according to claim 1, wherein the determining of the priorities of the HARQ-ACK bits in the first HARQ-ACK codebook according to at least one of the DAIs indicated by the DCI corresponding to the first HARQ-ACK codebook or the indexes of the carriers where the PDSCHs corresponding to the first HARQ-ACK codebook are located comprises:
   determining the priorities according to: at least one of an ascending order or a descending order of the DAIs indicated by the DCI corresponding to the first HARQ-ACK codebook; or at least one of an ascending order or a descending order of the indexes of the carriers where the PDSCHs corresponding to the first HARQ-ACK codebook are located.

3. The method according to claim 1, wherein the bit compression comprises one or more of: code block group (CBG) compression or spatial compression.

4. The method according to claim 1, wherein the preset configuration further comprises one or more of:
   a code rate of HARQ-ACK transmission;
   a time domain resource of HARQ-ACK transmission; or
   a frequency domain resource of HARQ-ACK transmission.

5. A terminal, comprising: a processor, a memory, and a computer program stored in the memory and executable on the processor; wherein the computer program, when executed by the processor, causes the terminal to perform:
   determining priorities of hybrid automatic repeat request acknowledgement (HARQ-ACK) bits in a first HARQ-ACK codebook according to at least one of downlink assignment indexes (DAIs) indicated by downlink control information (DCI) corresponding to the first HARQ-ACK codebook or indexes of carriers where physical downlink shared channels (PDSCHs) corresponding to the first HARQ-ACK codebook are located;
   selecting at least a part of the HARQ-ACK bits as a first HARQ-ACK bit from the first HARQ-ACK codebook according to the priorities of the HARQ-ACK bits in the first HARQ-ACK codebook and a preset configuration comprising a quantity of multiplexed HARQ-ACK bits;
   performing at least one of: discarding the first HARQ-ACK bit; or
   multiplexing the first HARQ-ACK bit with HARQ-ACK bits in a second HARQ-ACK codebook, wherein a priority of the first HARQ-ACK codebook is lower than a priority of the second HARQ-ACK codebook; and
   after bit compression is performed on HARQ-ACK bits other than the first HARQ-ACK bit in the first HARQ-ACK codebook, multiplexing the bit-compressed HARQ-ACK bits other than the first HARQ-ACK bit in the first HARQ-ACK codebook with the HARQ-ACK bits in the second HARQ-ACK codebook.

6. The terminal according to claim 5, wherein the computer program, when executed by the processor, causes the terminal to perform:

determining the priorities according to; at least one of an ascending order or a descending order of the DAIs indicated by the DCI corresponding to the first HARQ-ACK codebook; or at least one of an ascending order or a descending order of the indexes of the carriers where the PDSCHs corresponding to the first HARQ-ACK codebook are located.

7. A non-transitory computer-readable storage medium, wherein the non-transitory computer-readable storage medium stores a computer program, and the computer program, when executed by a processor of a terminal, causes the terminal to perform:

determining priorities of hybrid automatic repeat request acknowledgement (HARQ-ACK) bits in a first HARQ-ACK codebook according to at least one of downlink assignment indexes (DAIs) indicated by downlink control information (DCI) corresponding to the first HARQ-ACK codebook or indexes of carriers where physical downlink shared channels (PDSCHs) corresponding to the first HARQ-ACK codebook are located;

selecting at least a part of the HARQ-ACK bits as a first HARQ-ACK bit from the first HARQ-ACK codebook according to the priorities of the HARQ-ACK bits in the first HARQ-ACK codebook and a preset configuration comprising a quantity of multiplexed HARQ-ACK bits;

performing at least one of: discarding the first HARQ-ACK bit; or multiplexing the first HARQ-ACK bit with HARQ-ACK bits in a second HARQ-ACK codebook, wherein a priority of the first HARQ-ACK codebook is lower than a priority of the second HARQ-ACK codebook; and after bit compression is performed on HARQ-ACK bits other than the first HARQ-ACK bit in the first HARQ-ACK codebook, multiplexing the bit-compressed HARQ-ACK bits other than the first HARQ-ACK bit in the first HARQ-ACK codebook with the HARQ-ACK bits in the second HARQ-ACK codebook.

* * * * *